United States Patent
Mellet et al.

(10) Patent No.: US 8,438,941 B2
(45) Date of Patent: May 14, 2013

(54) EIGHT SPEED DUAL CLUTCH TRANSMISSION

(75) Inventors: Edward W. Mellet, Rochester Hills, MI (US); Scott H. Wittkopp, Ypsilanti, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/087,049

(22) Filed: Apr. 14, 2011

(65) Prior Publication Data

US 2012/0260756 A1    Oct. 18, 2012

(51) Int. Cl.
*F16H 3/08*    (2006.01)
(52) U.S. Cl.
USPC ............................................. 74/330
(58) Field of Classification Search .......... 74/330, 74/331, 333, 340
See application file for complete search history.

(56) References Cited

U.S. PATENT DOCUMENTS

| | | | | |
|---|---|---|---|---|
| 7,287,443 | B2 * | 10/2007 | Kuhstrebe et al. | 74/335 |
| 7,621,195 | B2 * | 11/2009 | Hattori | 74/331 |
| 8,011,261 | B2 * | 9/2011 | Diemer et al. | 74/330 |
| 8,117,932 | B2 * | 2/2012 | Bjorck et al. | 74/329 |
| 8,151,662 | B2 * | 4/2012 | Fitzgerald et al. | 74/330 |
| 2007/0199393 | A1 * | 8/2007 | Hattori | 74/331 |
| 2008/0134817 | A1 * | 6/2008 | Bjorck et al. | 74/330 |
| 2011/0067512 | A1 * | 3/2011 | Kang et al. | 74/330 |

* cited by examiner

*Primary Examiner* — Ha D. Ho

(57) ABSTRACT

A transmission is connectable to an input member and includes an output transfer gear, first and second shaft members, first and second countershaft members, a plurality of co-planar gear sets, and a plurality of torque transmitting devices. The torque transmitting devices include a plurality of gears, synchronizer assemblies and a dual clutch assembly. The transmission is operable to provide at least one reverse speed ratio and a plurality of forward speed ratios between the input member and the output member.

20 Claims, 1 Drawing Sheet

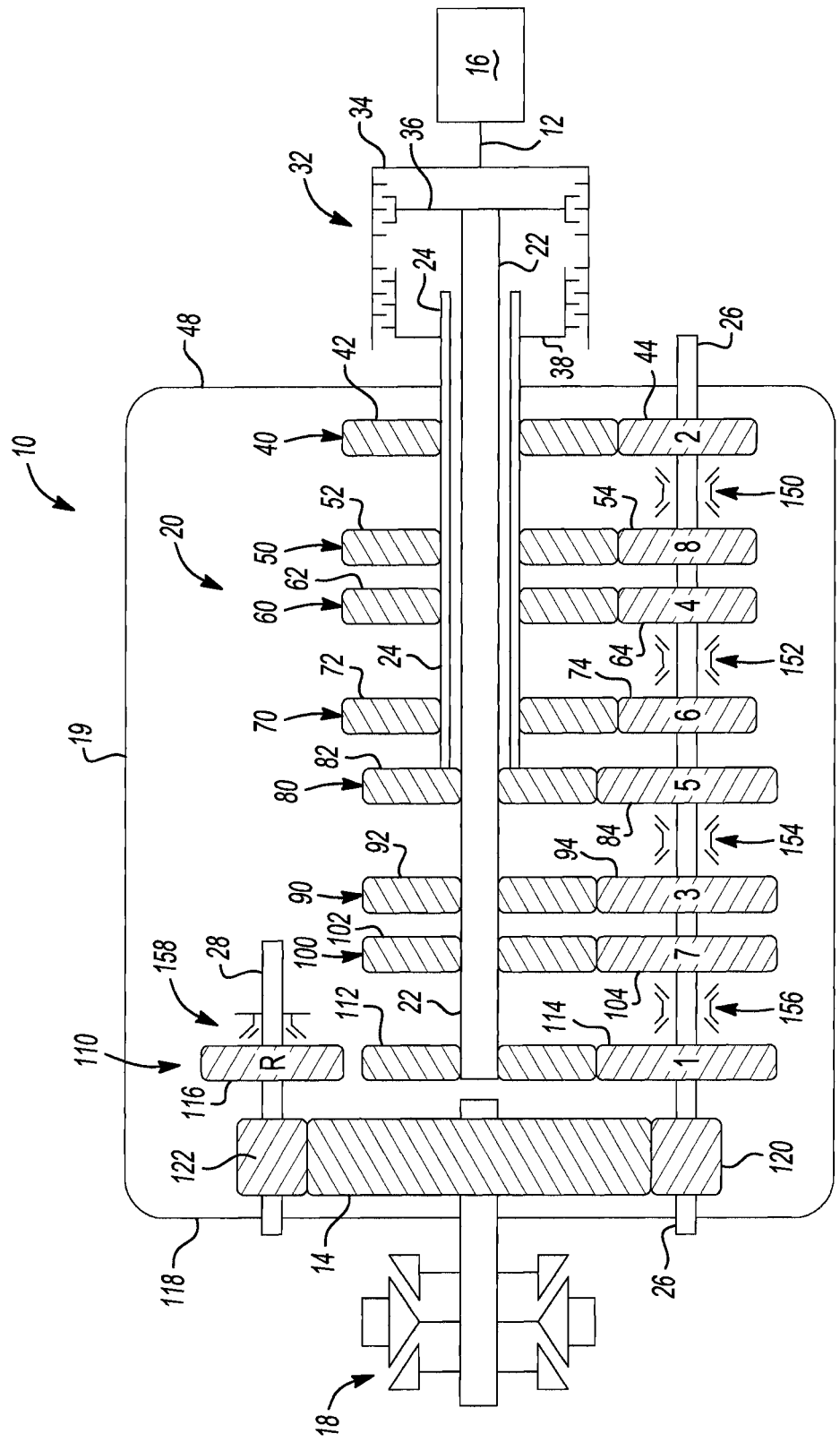

EIGHT SPEED DUAL CLUTCH TRANSMISSION

TECHNICAL FIELD

The present disclosure relates to transmissions and more particularly to a compact, dual clutch multiple speed transmission having at least two countershafts to establish eight or more gear speeds.

BACKGROUND

The statements in this section merely provide background information related to the present disclosure and may or may not constitute prior art.

A typical multiple speed transmission having countershafts and co-planar gear sets uses countershaft gears with a gear pair or set to achieve each forward speed ratio. While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission that is connectable to an input member and includes an output member, first and second shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In another aspect of the present invention, the transmission includes a transmission housing.

In another aspect of the present invention, the transmission includes a dual clutch assembly having a first clutch, second clutch, and a clutch housing connectable to an engine output member. The clutch housing is rotationally supported within the transmission housing.

In another aspect of the present invention, the transmission includes a first, second, third, fourth, fifth, sixth, seventh, and eighth gear set. The first gear set includes a first gear in mesh with a second gear. The second gear set includes a first gear in mesh with a second gear. The third gear set includes a first gear in mesh with a second gear. The fourth gear set includes a first gear in mesh with a second gear. The fifth gear set includes a first gear in mesh with a second gear. The sixth gear set includes a first gear in mesh with a second gear. The seventh gear set includes a first gear in mesh with a second gear. The eighth gear set includes a first gear in mesh with a second gear.

In another aspect of the present invention, the transmission includes a first transmission input member rotatably supported in the transmission housing. Each of the first gears of the fifth, sixth, seventh, and eighth gear sets are rotatably fixed for common rotation with the first transmission input member and the selective engagement of the first clutch of the dual clutch assembly transfers torque from the clutch housing to the first transmission input member.

In another aspect of the present invention, the transmission includes a second transmission input member rotatably supported in the transmission housing. Each of the first gears of the first, second, third, and fourth gear sets are rotatably fixed for common rotation with the second transmission input member and the second transmission input member is concentric with the first transmission input member and at least partially surrounds the first transmission input member. Selective engagement of the second clutch of the dual clutch assembly transfers torque from the clutch housing to the second transmission input member.

In another aspect of the present invention, the transmission includes a first countershaft rotatably supported within the transmission housing and spaced apart from and parallel with the first and second transmission input members. The second gears of the first, second, third, fourth, fifth, sixth, seventh, and eighth gear set are each selectively connectable for common rotation with the first countershaft.

In another aspect of the present invention, the transmission includes a second countershaft rotatably supported within the transmission housing and spaced apart from and parallel with the first and second transmission input members. The second countershaft supports a reverse gear that is meshed with one of the second gears of the first, second, third, fourth, fifth, sixth, seventh, and eighth gear.

In another aspect of the present invention, the transmission includes five synchronizer assemblies each for selectively coupling at least one of the gears of the first, second, third, fourth, fifth and sixth gear sets and the reverse gear with at least one of the first countershaft and the second countershaft.

In another aspect of the present invention, selective engagement of the first and second clutches of the dual clutch assembly interconnects the dual clutch housing with at least one of the first and the second transmission input members and the selective engagement of at least one of the five synchronizer assemblies establishes at least one of eight forward speed ratios.

The above features and advantages and other features and advantages of the present invention are readily apparent from the following detailed description of the best modes for carrying out the invention when taken in connection with the accompanying drawing wherein like reference numbers refer to the same component, element or feature.

BRIEF DESCRIPTION OF THE DRAWING

The drawing is a schematic view of an embodiment of an eight speed transmission having a dual clutch, two input shafts, a plurality of gear sets and a plurality of synchronizers, in accordance with the present invention.

DESCRIPTION

Referring to the drawing, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 18. The differential assembly 18 transfers torque delivered by output member 14, ultimately, to a pair road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, and a second countershaft 28. The second transmission input shaft or member 24 is a hollow shaft that is concentric with and overlies the first transmission input shaft or member 22. The first countershaft 26 and the second countershaft 28 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that while the dual clutch assembly 32 is shown throughout the drawing as a wet clutch assembly, the dual clutch assembly 32 may be a dry clutch assembly without departing from the scope of the present invention.

The gearing arrangement 20 also includes a plurality of co-planar, meshing gear sets 40, 50, 60, 70, 80, 90, 100, and 110. The present invention contemplates that the plurality of co-planar, meshing gear sets 40, 50, 60, 70, 80, 90, 100, and 110 may be arranged axially along transmission input shafts 22, 24 in an order other than that which is shown in the drawing and still be within the scope of the invention. Co-planar gear set 40 includes first pinion gear 42 and second pinion gear 44. First pinion gear 42 is rotatably fixed and connected for common rotation with the second transmission input shaft member 24. Second pinion gear 44 is selectively connectable for common rotation with the first countershaft member 26 and meshes with first pinion gear 42. It should be appreciated that first pinion gear 42 may be a separate gear structure fixed to the second transmission input shaft member 24 or gear teeth/splines formed on an outer surface of the second transmission input shaft member 24 without departing from the scope of the present invention. Gear set 40 is disposed proximate a wall 48 of the transmission housing 19 that is on a front or side of the transmission 10 proximate the dual clutch assembly 32.

Co-planar gear set 50 includes first pinion gear 52 and second pinion gear 54. First pinion gear 52 is rotatably fixed and connected for common rotation with the second transmission input shaft member 24 and meshes with second pinion gear 54. Second pinion gear 54 is selectively connectable for common rotation with the first countershaft member 26. Gear set 50 is positioned adjacent gear set 40.

Co-planar gear set 60 includes first pinion gear 62 and second pinion gear 64. First pinion gear 62 is rotatably fixed and connected for common rotation with the second transmission input shaft member 24 and meshes with second pinion gear 64. Second pinion gear 64 is selectively connectable for common rotation with the first countershaft member 26. Gear set 60 is disposed adjacent gear set 50.

Co-planar gear set 70 includes first pinion gear 72 and second pinion gear 74. First pinion gear 72 is rotatably fixed and connected for common rotation with the second transmission input shaft member 24 and meshes with second pinion gear 74. Second pinion gear 74 is selectively connectable for common rotation with the first countershaft member 26. Gear set 70 is positioned adjacent gear set 60.

Co-planar gear set 80 includes first pinion gear 82 and second pinion gear 84. First pinion gear 82 is rotatably fixed and connected for common rotation with the first transmission input shaft member 22 and meshes with second pinion gear 84. Second pinion gear 84 is selectively connectable for common rotation with the first countershaft member 26. Gear set 80 is positioned adjacent gear set 70.

Co-planar gear set 90 includes first pinion gear 92 and second pinion gear 94. First pinion gear 92 is rotatably fixed and connected for common rotation with the first transmission input shaft member 22 and meshes with second pinion gear 94. Second pinion gear 94 is selectively connectable for common rotation with the first countershaft member 26. Gear set 90 is positioned adjacent gear set 80.

Co-planar gear set 100 includes first pinion gear 102 and second pinion gear 104. First pinion gear 102 is rotatably fixed and connected for common rotation with the first transmission input shaft member 22 and meshes with second pinion gear 104. Second pinion gear 104 is selectively connectable for common rotation with the first countershaft member 26. Gear set 100 is positioned adjacent gear set 90.

Co-planar gear set 110 includes first pinion gear 112, second pinion gear 114, and third pinion gear 116. First pinion gear 112 is rotatably fixed and connected for common rotation with the first transmission input shaft member 22 and meshes with second pinion gear 114. Second pinion gear 114 is selectively connectable for common rotation with the first countershaft member 26. Third pinion gear 116 is selectively connectable for common rotation with the second countershaft member 28 and meshes with second pinion gear 114. Gear set 110 is positioned between gear set 100 and an end wall 118 of the transmission housing 19. In alternative embodiments, third pinion gear 116 is meshed with one of the second pinion gears 44, 54, 64, 74, 84, 94, 104 rather than with pinion gear 114.

Further, a first countershaft transfer gear 120 is rotatably fixed and connected for common rotation with the first countershaft member 26. A second countershaft transfer gear 122 is rotatably fixed and connected for common rotation with the second countershaft member 28. First countershaft transfer gear 120 is configured to mesh with output member 14 and the second countershaft transfer gear 122 is configured to mesh with output member 14. However, the first countershaft transfer gear 120 and the second countershaft transfer gear 122 do not mesh with each other.

A park gear (not shown) may be provided for placing transmission 10 in a park mode that prevents output member 14 from rotating. The park gear may be rotationally fixed to the first countershaft member 26 or to the second countershaft member 28. However, the axial location of the park gear along the first or second countershaft members 26, 28 may be changed in accordance with available packaging space.

With continued reference to the drawing, the transmission 10 further includes a plurality of selectively engageable synchronizer assemblies 150, 152, 154, 156 and 158. Synchronizers 150, 152, 154 and 156 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect gear 44 for common rotation with the first countershaft member 26 and is selectively actuatable to connect gear 54 for common rotation with the first countershaft member 26. Synchronizer 152 is selectively actuatable to connect for common rotation gear 64 with the first countershaft member 26 and is selectively actuatable to connect for common rotation gear 74 with the first countershaft member 26. Synchronizer 154 is selectively actuatable to connect for common rotation gear 84 with the first countershaft member 26 and is selectively actuatable to connect for common rotation gear 94 with the first countershaft member 26. Synchronizer 156 is selectively actuatable to connect for common rotation gear 104 with the first countershaft member 26 and is selectively actuatable to connect for common rotation gear 114 with the first countershaft member 26. Synchronizer 158 is a single sided synchronizer and generally includes a shift fork (not shown) that is bi-directionally translated by an actuator (not shown) into at least one engaged position and a neutral or disengaged position. Synchronizer 158 is selectively actuatable to connect for common rotation gear 116 with the second countershaft member 28.

The transmission 10 is capable of transmitting torque from the input shaft 12 to the output gear member 14 in at least eight forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should be appreciated that each individual gear set 40, 50, 60, 70, 80, 90, 100, and 110 provides one or more forward and/or reverse gear ratios upon selective engagement of the synchronizer assemblies 150, 152, 154, 156 and 158. It should also be appreciated that a particular forward or reverse speed ratio may be achieved by different combinations of synchronizer and associated gear sets without departing from the scope of the present invention.

For example, to establish the reverse torque ratio, clutch element 36 is engaged and synchronizer 158 is activated. Clutch element 36 couples the input member 12 with the first transmission input shaft member 22. Synchronizer 158 connects gear 116 to the second countershaft member 28. More specifically, input torque from the input shaft 12 is transferred through the dual clutch assembly 32 to the first transmission input shaft member 22, through pinion gear 112 to gear 114, through gear 114 to gear 116, from gear 116 to the second countershaft member 28 through synchronizer 158, then to second countershaft transfer gear 122 and from second countershaft transfer gear 122 to the output member 14.

To establish a first forward torque ratio (i.e. a 1st gear), clutch element 36 is engaged and synchronizer 156 is activated. Clutch element 36 couples the input member 12 with the first transmission input shaft member 22. Synchronizer 156 couples gear 114 to the first countershaft member 26. Input torque from the input member 12 is transferred through the dual clutch assembly 32 to the first transmission input shaft member 22 to pinion 112. Pinion 112 transfers torque to gear 114 which transfers the torque to the first countershaft member 26 through synchronizer 156 and from the first countershaft member 26 to first countershaft transfer gear 120 and then from first countershaft transfer gear 120 to the output member 14.

To establish a second forward torque ratio (i.e. a 2nd gear), clutch element 38 is engaged and synchronizer 150 is activated. Clutch element 38 couples the input member 12 to the second transmission input shaft member 24, which rotates pinion 42. Synchronizer 150 couples gear 44 to the first countershaft member 26. Accordingly, input torque from the input member 12 is transferred through the dual clutch assembly 32 to the second transmission input shaft member 24, through pinion 42 to gear 44, from gear 44 to synchronizer 150, from synchronizer 150 to the first countershaft member 26 and from the first countershaft member 26 to the first countershaft transfer gear 120 and the output member 14.

To establish a third forward torque ratio (i.e. a 3rd gear), clutch element 36 is engaged and synchronizer 154 is activated. Clutch element 36 couples the input member 12 to the first transmission input shaft member 22, which rotates pinion 92. Synchronizer 154 couples gear 94 to the first countershaft member 26. Thus, input torque from the input member 12 is transferred through the dual clutch assembly 32 to the first transmission input shaft member 22, through pinion 92 to gear 94, through gear 94 to synchronizer 154, from synchronizer 154 to the first countershaft member 26, from the first countershaft member 26 to the first countershaft transfer gear 120 and then from first countershaft transfer gear 120 to the output member 14.

To establish a fourth forward torque ratio (i.e. a 4th gear), clutch element 38 is engaged and synchronizer 152 is activated. Clutch element 38 couples the input member 12 to the second transmission input shaft member 24, which rotates pinion 62. Synchronizer 152 couples gear 64 to the first countershaft member 26. Thus, input torque from the input member 12 is transferred through the dual clutch assembly 32 to the second transmission input shaft member 24 to pinion 62, then from pinion 62 to gear 64, from gear 64 to synchronizer 152, from synchronizer 152 to the first countershaft member 26, from the first countershaft member 26 to first countershaft transfer gear 120 and then from first countershaft transfer gear 120 to the output member 14.

To establish a fifth forward torque ratio (i.e. a 5th gear), clutch element 36 is engaged and synchronizer 154 is activated. Clutch element 36 couples the input member 12 to the first transmission input shaft member 22, which rotates pinion 82. Synchronizer 154 couples gear 84 to the first countershaft member 26. Input torque from the input member 12 is transferred through the dual clutch assembly 32 to the first transmission input shaft member 22, from first transmission input shaft member 22 to pinion 82, from pinion 82 to gear 84, from gear 84 to the first countershaft member 26 through synchronizer 154 to the first countershaft transfer gear 120 and from the first countershaft transfer gear 120 to the output member 14.

To establish a sixth forward torque ratio (i.e. a 6th gear), clutch element 38 is engaged and synchronizer 152 is activated. Clutch element 38 couples the input member 12 to the second transmission input shaft member 24, which rotates pinion 72. Synchronizer 152 couples gear 74 to the first countershaft member 26. Thus, input torque from the input member 12 is transferred through the dual clutch assembly 32 to the second transmission input shaft member 24 to pinion 72, then from pinion 72 to gear 74, from gear 74 to synchronizer 152, from synchronizer 152 to the first countershaft member 26, from the first countershaft member 26 to first countershaft transfer gear 120 and then from first countershaft transfer gear 120 to the output member 14.

To establish a seventh forward torque ratio (i.e. a 7th gear), clutch element 36 is engaged and synchronizer 156 is activated. Clutch element 36 couples the input member 12 to the first transmission input shaft member 22, which rotates pinion 102. Synchronizer 156 couples gear 104 to the first countershaft member 26. Input torque from the input member 12 is transferred through the dual clutch assembly 32 to the first transmission input shaft member 22, from first transmission input shaft member 22 to pinion 102, from pinion 102 to gear 104, from gear 104 to the first countershaft member 26 through synchronizer 156 to first countershaft transfer gear 120 and from first countershaft transfer gear 120 to the output member 14.

To establish an eighth forward torque ratio (i.e. an 8th gear), clutch element 38 is engaged and synchronizer 150 is activated. Clutch element 38 couples the input member 12 to the second transmission input shaft member 24, which rotates pinion 52. Synchronizer 150 couples gear 54 to the first countershaft member 26. Input torque from the input member 12 is transferred through the dual clutch assembly 32 to the second transmission input shaft member 24, from second transmission input shaft member 24 to pinion 52, from pinion 52 to gear 54, from gear 54 to the first countershaft member 26 through synchronizer 150 to first countershaft transfer gear 120 and from first countershaft transfer gear 120 to the output member 14.

Again, it should be appreciated that any one of the gears of gear sets 40, 50, 60, 70, 80, 90, 100, and 110 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, the present configuration allows for favorable progression between the first gear ratio and the eighth gear ratio by employing separate pinion gears for each forward gear ratio. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
 a transmission housing;
 a dual clutch assembly having a first clutch, second clutch and a clutch housing connectable to an engine output member, wherein the clutch housing is rotationally supported within the transmission housing;
 a first, second, third, fourth, fifth, sixth, seventh, and eighth gear set, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear, the sixth gear set includes a first gear in mesh with a second gear, the seventh gear set includes a first gear in mesh with a second gear, and the eighth gear set includes a first gear in mesh with a second gear;
 a first transmission input member rotatably supported in the transmission housing and wherein each of the first gears of the fifth, sixth, seventh, and eighth gear sets are rotatably fixed for common rotation with the first transmission input member and wherein the selective engagement of the first clutch of the dual clutch assembly transfers torque from the clutch housing to the first transmission input member;
 a second transmission input member rotatably supported in the transmission housing and wherein each of the first gears of the first, second, third, and fourth gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque from the clutch housing to the second transmission input member;
 a first countershaft rotatably supported within the transmission housing and spaced apart from and parallel with the first and second transmission input members, wherein the second gears of the first, second, third, fourth, fifth, sixth, seventh, and eighth gear set are each selectively connectable for common rotation with the first countershaft;
 a second countershaft rotatably supported within the transmission housing and spaced apart from and parallel with the first and second transmission input members, wherein the second countershaft supports a reverse gear that is meshed with one of the second gears of the first, second, third, fourth, fifth, sixth, seventh, and eighth gear sets; and
 five synchronizer assemblies each for selectively coupling at least one of the gears of the first, second, third, fourth, fifth, sixth, seventh, and eighth gear sets and the reverse gear with at least one of the first countershaft and the second countershaft, and
 wherein the selective engagement of the first and second clutches of the dual clutch assembly interconnects the dual clutch housing with at least one of the first and the second transmission input members and the selective engagement of at least one of the five synchronizer assemblies establishes at least one of eight forward speed ratios.

2. The transmission of claim 1 wherein a first of the five synchronizer assemblies selectively connects at least one of the second gear of the first gear set and the second gear of the second gear set to the first countershaft.

3. The transmission of claim 2 wherein a second of the five synchronizer assemblies selectively connects at least one of the second gear of the third gear set and second gear of the fourth gear set to the first countershaft.

4. The transmission of claim 3 wherein a third of the five synchronizer assemblies selectively connects at least one of the second gear of the fifth gear set and the second gear of the sixth gear set to the first countershaft.

5. The transmission of claim 4 wherein a fourth of the five synchronizer assemblies selectively connects at least one of the second gear of the seventh gear set and second gear of the eighth gear set to the first countershaft.

6. The transmission of claim 5 wherein a fifth of the five synchronizer assemblies selectively connects the reverse gear to the second countershaft.

7. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is disposed between the seventh gear set and an end wall of the transmission housing.

8. The transmission of claim 7 wherein the five synchronizer assemblies include a first synchronizer assembly for selectively connecting the second gear of the first gear set to the first countershaft to establish a second gear ratio when the second clutch of the dual clutch is engaged to connect the dual clutch housing to the second transmission input member.

9. The transmission of claim 8 wherein the first synchronizer assembly selectively connects the second gear of the second gear set to the first countershaft to establish an eighth gear ratio when the second clutch of the dual clutch is engaged to connect the dual clutch housing to the second transmission input member.

10. The transmission of claim 9 wherein the five synchronizer assemblies include a second synchronizer assembly for selectively connecting the second gear of the third gear set to the first countershaft to establish a fourth gear ratio when the second clutch of the dual clutch is engaged to connect the dual clutch housing to the second transmission input member.

11. The transmission of claim 10 wherein the second synchronizer assembly selectively connects the second gear of the fourth gear set to the first countershaft to establish a sixth gear ratio when the second clutch of the dual clutch is engaged to connect the dual clutch housing to the second transmission input member.

12. The transmission of claim 11 wherein the five synchronizer assemblies include a third synchronizer assembly for selectively connecting the second gear of the fifth gear set to the first countershaft to establish a fifth gear ratio when the first clutch of the dual clutch is engaged to connect the dual clutch housing to the first transmission input member.

13. The transmission of claim 12 wherein the third synchronizer assembly selectively connects the second gear of the sixth gear set to the first countershaft to establish a third gear ratio when the first clutch of the dual clutch is engaged to connect the dual clutch housing to the first transmission input member.

14. The transmission of claim 13 wherein the five synchronizer assemblies include a fourth synchronizer assembly for selectively connecting the second gear of the seventh gear set to the first countershaft to establish a seventh gear ratio when the first clutch of the dual clutch is engaged to connect the dual clutch housing to the first transmission input member.

15. The transmission of claim 14 wherein the fourth synchronizer assembly selectively connects the second gear of the eighth gear set to the first countershaft to establish a first gear ratio when the first clutch of the dual clutch is engaged to connect the dual clutch housing to the first transmission input member.

16. The transmission of claim 15 wherein the five synchronizer assemblies include a fifth synchronizer assembly for selectively connecting the reverse gear to the second countershaft to establish a reverse gear ratio when the first clutch of the dual clutch is engaged to connect the dual clutch housing to the first transmission input member.

17. The transmission of claim 1 further comprising a first countershaft transfer gear fixed to the first countershaft for common rotation with the first countershaft and a second countershaft transfer gear fixed to the second countershaft for common rotation with the second countershaft, and wherein the first and second countershaft transfer gears transfer torque from at least one of the first and second countershafts to a transmission output member.

18. The transmission of claim 17 wherein the transmission output member is a gear that meshes with the each of the first and second countershaft transfer gears.

19. The transmission of claim 1 wherein the reverse gear is meshed with the second gear of the eighth gear set.

20. A transmission comprising:
   a transmission housing;
   a dual clutch assembly having a first clutch, second clutch, and a clutch housing connectable to an engine output member, wherein the clutch housing is rotationally supported within the transmission housing;
   a first, second, third, fourth, fifth, sixth, seventh, and eighth gear set, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear, the sixth gear set includes a first gear in mesh with a second gear, the seventh gear set includes a first gear in mesh with a second gear, and the eighth gear set includes a first gear in mesh with a second gear and includes a third gear in mesh with the second gear;
   a first transmission input member rotatably supported in the transmission housing and wherein each of the first gears of the fifth, sixth, seventh, and eighth gear sets are rotatably fixed for common rotation with the first transmission input member and wherein the selective engagement of the first clutch of the dual clutch assembly transfers torque from the clutch housing to the first transmission input member;
   a second transmission input member rotatably supported in the transmission housing and wherein each of the first gears of the first, second, third, and fourth gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque from the clutch housing to the second transmission input member;
   a first countershaft rotatably supported within the transmission housing and spaced apart from and parallel with the first and second transmission input members, wherein the second gears of the first, second, third, fourth, fifth, sixth, seventh, and eighth gear set are each selectively connectable for common rotation with the first countershaft;
   a second countershaft rotatably supported within the transmission housing and spaced apart from and parallel with the first and second transmission input members, wherein the third gear of the eighth gear set is selectively connectable for common rotation with the second countershaft;
   a first synchronizer assembly that selectively connects at least one of the second gear of the first gear set and the second gear of the second gear set to the first countershaft;

a second synchronizer assembly that selectively connects at least one of the second gear of the third gear set and second gear of the fourth gear set to the first countershaft;

a third synchronizer assembly that selectively connects at least one of the second gear of the fifth gear set and the second gear of the sixth gear set to the first countershaft;

a fourth synchronizer assembly selectively connects at least one of the second gear of the seventh gear set and second gear of the eighth gear set to the first countershaft;

a fifth synchronizer assembly that selectively connects the third gear of the eighth gear set to the second countershaft; and a first countershaft transfer gear fixed to the first countershaft for common rotation with the first countershaft and a second countershaft transfer gear fixed to the second countershaft for common rotation with the second countershaft, and wherein the first and second countershaft transfer gears transfer torque from at least one of the first and second countershafts to a transmission output member, and wherein the selective engagement of the first and second clutches of the dual clutch assembly and the selective engagement of at least one of the synchronizer assemblies establishes at least one of eight forward speed ratios between the at least one of the first and the second transmission input members and the transmission output member.

* * * * *